(12) United States Patent
Tübinger et al.

(10) Patent No.: US 7,270,504 B2
(45) Date of Patent: Sep. 18, 2007

(54) CUTTING TOOL FOR METAL WORKING AS WELL AS METHOD IN THE PRODUCTION OF CUTTING TOOLS

(75) Inventors: Klas Tübinger, Järbo (SE); Mikael Herdin, Osthammar (SE); Dan Höglund, Gimo (SE)

(73) Assignee: Sandvik Intellectual Property AB, Sandviken (SE)

( * ) Notice: Subject to any disclaimer, the term of this patent is extended or adjusted under 35 U.S.C. 154(b) by 607 days.

(21) Appl. No.: 10/846,632

(22) Filed: May 17, 2004

(65) Prior Publication Data

US 2005/0002744 A1    Jan. 6, 2005

(30) Foreign Application Priority Data

May 16, 2003    (SE)    .................................... 0301450

(51) Int. Cl.
*B23B 51/00* (2006.01)
*B21K 5/04* (2006.01)

(52) U.S. Cl. ................. 408/227; 76/108.6; 76/115; 408/144; 408/713; 408/226

(58) Field of Classification Search ............ 408/144, 408/226, 227, 230, 231, 233, 713; 76/108.1, 76/108.6, 115
See application file for complete search history.

(56) References Cited

U.S. PATENT DOCUMENTS 4,674,365 A    6/1987    Reed
5,240,514 A    8/1993    Yasuura et al.
5,609,447 A *  3/1997    Britzke et al. ............. 408/230
5,992,204 A * 11/1999    Jonkka et al. .............. 72/340
6,058,807 A    5/2000    Fujii et al.
6,105,374 A    8/2000    Kamody
6,220,797 B1 * 4/2001    Ishii et al. ................. 408/144

FOREIGN PATENT DOCUMENTS

| EP | 0 499 132 B1 | 8/1992 |
| EP | 0 506 106 B1 | 9/1992 |
| EP | 1 219 863 A2 | 7/2002 |
| GB | 912954 | 12/1962 |
| GB | 2153855 A | 8/1985 |
| JP | 63-093821 | 4/1988 |
| JP | 0 536 986 A1 | 4/1993 |
| JP | 9176792 A | 8/1997 |

* cited by examiner

*Primary Examiner*—Daniel W. Howell
(74) *Attorney, Agent, or Firm*—Drinker Biddle & Reath LLP

(57) ABSTRACT

A cutting tool and a method for the production of cutting tools for metalworking characterized in that the holder body of the tool first is submitted to a surface hardening that results in the formation of compressive stresses in the surface and then submitted to a surface treatment that gives additional contribution of compressive stresses in the surface. In this way, it is allowed to, on one hand, be able to modify/machine or remove parts of or the entire phase-transition layer obtained in the surface hardening at the same time as additional compressive stresses are built up in the surface of a hardened steel material in the tool body.

25 Claims, 4 Drawing Sheets

CUTTING TOOL FOR METAL WORKING AS WELL AS METHOD IN THE PRODUCTION OF CUTTING TOOLS

FIELD OF THE DISCLOSURE

The present disclosure relates to a new type of cutting tool for metalworking as well as a new method in the production of cutting tools, such as holder bodies having one or more cutting seats for indexable inserts. As examples of such tools, drills having a plurality of cutting plates of cemented carbide, cermet or ceramics may be mentioned.

BACKGROUND

In the description of the background of the present disclosure that follows, reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

In drilling, for instance, the tool is given a rectilinear axial feeding motion. The proper tool body may, for instance, consist of a shaft-type cutter, an end mill or a drilling tool. Common for these is that they usually carry a plurality of cutting plates of a hard material, such as cemented carbide. Said cutting plates are usually of an indexable insert type, i.e., they may be loosened and turned or "be re-indexed" when a cutting edge has been worn out and the operator desires to advance a new cutting edge in the operative position by turning. In order to achieve a fine and smooth surface in the workpiece, it is necessary that the operative cutting edges of the cutting inserts describe substantially identical rotation paths, i.e., in, for instance, a shaft-type cutter or an end mill, they should have substantially the same axial and radial position in the milling body. This makes, among other things, exceptionally heavy demands on precision of the production of the cutting seats in the milling body. If, for instance, the axial positioning is unsatisfactory, so-called axial runout arise, which lead to worsen consequences.

Furthermore, today's modern tools are exposed to very strong chip wear, which imposes greater requirements on the hardness of the surface of the holder body, especially at the material portions thereof that are located next to the cutting seats and that are exposed to direct chip contact in the machining. It is, above all, the surface of the holder body being closest to the cutting seat straight opposite in the direction of circumference that will be strongly exposed to this wear.

Furthermore, now greater requirements are imposed on fatigue strength of the material in the tool body, since they become more and more optimized in the design thereof.

A known way to increase the fatigue strength of the material is to provide compressive stresses in the surface by surface hardening the material, e.g., by nitriding, nitrogen alone being transferred to the surface of the holder body, usually steel, in a gas atmosphere, essentially at a temperature of 510–550° C. Another way is to subject the material to nitrocarburizing, carbon and nitrogen being transferred to the surface in a gas atmosphere, normally at a temperature of approximately 570° C. An additional known way is to submit the material to so-called ion nitriding, when nitrogen alone is transferred to the surface in an ionized gas, under almost vacuum, at a temperature of approximately 450 to 650 C.

An additional known way to increase the fatigue strength of the material is to provide compressive stresses and improve the surface quality of the material by so-called micro blasting, which means that the surface of the material is bombarded with small particles in such a way that a part of the material is removed at the same time as compressive stresses are built up in the material. Another known way to increase the fatigue strength of the material by providing compressive stresses and improve the surface quality of the material is so-called shot peening, which is an established method used in order to increase the service life of metal components exposed to dynamic loads. Shot peening also prevents crack formation caused by stress corrosion. The idea of the method is to bombard, under accurately controlled forms, the surface with spherical particles of, for instance, steel, glass or ceramics.

SUMMARY

In the light of what has been said above, it is a first object to provide increased fatigue strength of materials suitable for the production of holder bodies of cutting tools for chip removing machining. Another object is to form a tool body that better than other ones resists strong chip wear. An additional object is to improve the position precision of the cutting seats in the tool. Starting materials for such tool bodies are normally hardened tool steels.

These and other objects have been attained by manufacturing a cutting tool according to the exemplary methods disclosed herein.

The material in the holder body is submitted to a surface hardening, which has a phase-transition layer and under the same a diffusion zone, which results in the formation of compressive stresses in the surface and that the holder is imparted additional compressive stresses by being subjected to a subsequent surface treatment. In this way, it has turned out to be possible to, on one hand, modify/machine or remove parts of or the entire phase-transition layer obtained in the surface hardening at the same time as, by means of the subsequent surface treatment, additional compressive stresses are built up in the surface.

BRIEF DESCRIPTION OF DRAWING FIGURES

Objects and advantages of the disclosed subject matter will become apparent from the following detailed description of preferred embodiments thereof in connection with the accompanying drawings in which like numerals designate like elements and in which.

The appended drawings show examples of a tool body to be submitted to treatment according to the exemplary methods disclosed herein as well as details of materials that have been submitted to a surface hardening as well as a surface treatment in accordance with the exemplary embodiments.

DETAILED DESCRIPTION OF PREFERRED EMBODIMENTS

Figure 1:
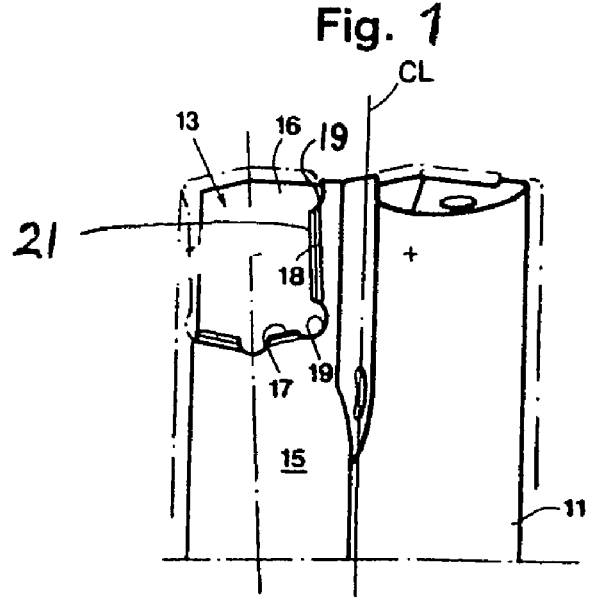
FIGS. 1 and 2 show two side views of a drill shaft of a typical tool body, more precisely in the form of a holder body of so-called short hole drills.
Figure 2:
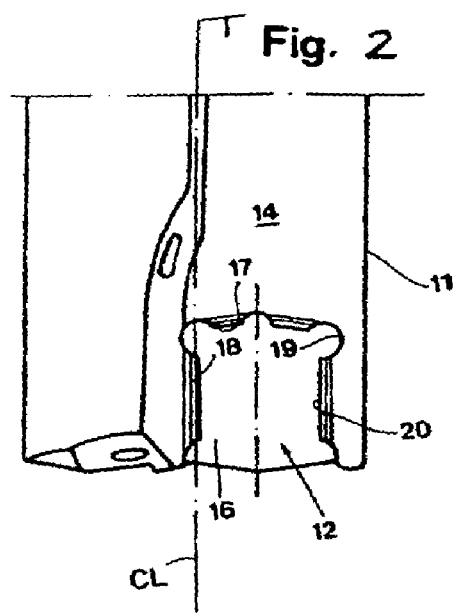

FIGS. 1 and 2 show a cylindrical drill shaft 11 that, at the front part thereof, is provided with two insert seatings 12 and 13 placed on both sides of the center line CL of the drill. Axial recesses or channels formed for the chip release are designated 14 and 15. The two insert seatings 12, 13 are centrally hole provided for receipt of locking screws (not shown) for locking of cutting inserts in the seatings. Each insert seating comprises a tangential support surface 16, an axial support surface 17 as well as a radial support surface 18. The support surfaces are arranged with additional gaps 19 in order to house a plurality of the corners of the cutting insert. The tangential support surfaces 16 are substantially parallel to radial planes through the centre line CL. Each axial support surface 17 is broken so that it forms a substantially v-shaped profile, the tip of which is directed axially rearwards towards the fastening part of the shaft. A surface 20 in the centre seating 12, which surface is opposite the radial support surface 18, has no supporting function of the cutting insert but only aims to prevent wedging of chips between the shaft and the centre cutting insert. The section transition between the radial support surface 18 and the tangential support surface 16 is designated 21. At said section transition 21, the maximal stress concentration in the insert pocket arises upon full engagement with a workpiece. Therefore, here it is desirable to be able to improve fatigue strength and as far as possible reduce the risk of crack initiation and propagation.

According to exemplary embodiments disclosed herein, a surprisingly improved fatigue strength of materials in the tool body is obtained by submitting the material to a surface hardening and a surface treatment following thereafter, which can build in compressive stresses into the surface at the same time as the risk of crack initiation and crack propagation can be significantly reduced, on one hand in and adjacent to the insert seatings, and on the other hand at portions axially behind the insert seatings of the tool holder body.

The surface hardening means that the material is submitted to a method that gives compressive stresses in the surface, e.g., by nitrocarburizing. Other methods for giving the corresponding compressive stresses may, for instance, be used, such as nitriding or ion nitriding in the way that has been described by way of introduction. The subsequent surface treatment has the purpose of modifying/machining or removing parts of or the entire phase-transition layer. This is done in order to remove initiated cracks and pores in the phase-transition layer, which are formed during the surface hardening and simultaneously build in additional compressive stresses.

According to an exemplary method, said surface treatment is made in the form of shot peening, which means that a number of small balls are bombarded against the surface of materials that are to be treated. According to an alternative exemplary method, the surface treatment may be made in the form of a micro blasting, which means that the surface of the material is bombarded with small particles in such a way that a part of the material is removed. By the micro blasting, a certain plastic deformation of the holder body is achieved, whereby the compression residual stresses are increased. Simultaneously, parts of or the entire phase-transition layer developed previously by the first treatment are modified/machined or removed. In the micro blasting, for instance, small balls of suitable steel material were used.

Figure 3:
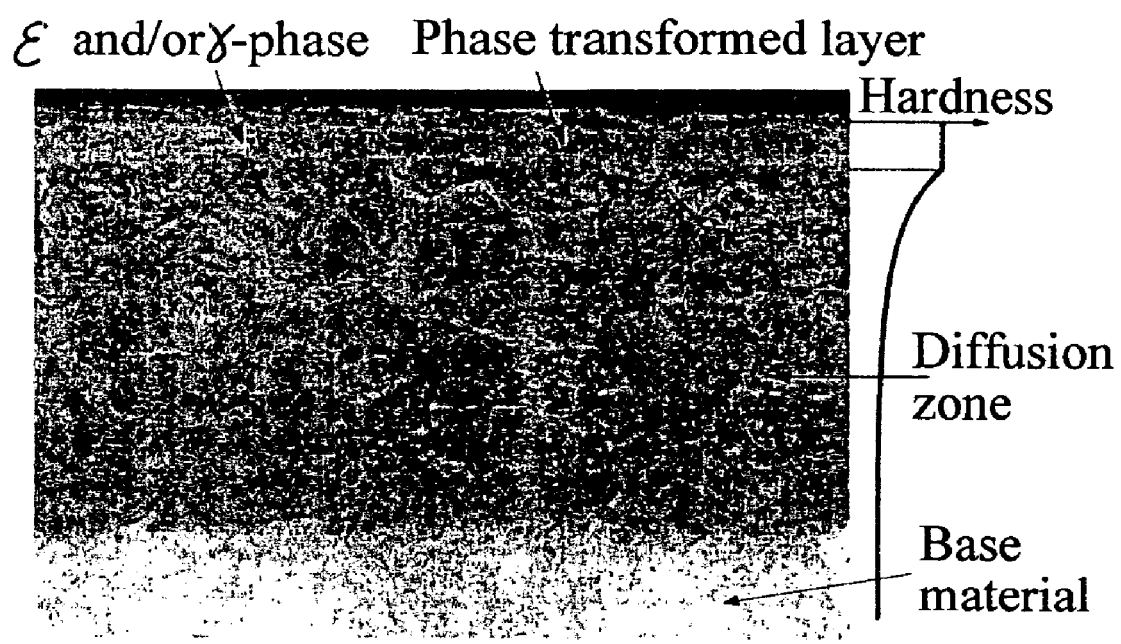
FIG. 3 shows the surface structure in cross-section of a tool body in 700 times enlargement after the surface hardening in the form of nitrocarburizing.

The structural picture shown in FIG. 3 shows the effect of the surface hardening. The surface zone obtained by the surface hardening comprises an outer phase-transition layer, which extends approximately 3 to 10 μm under the surface. Inside this phase-transition layer, a zone has been formed having a decreasing quantity of precipitates, which zone extends to approximately 100 to 200 μm under the surface. Thereby, the surface hardening has been obtained to a depth where the hardness has dropped to the same hardness value as of the base material in the tool body. The duration of the surface hardening in this first step is a time such that compressive stresses amount to a considerably higher value than the original base material. In FIG. 3, also the hardness profile according to the above has been illustrated more closely.

Figure 4:
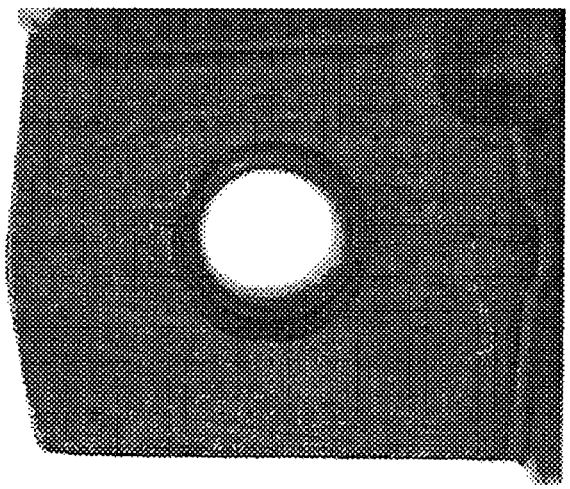
FIG. 4 shows an insert seating seen in top view, which only has been surface hardened according to FIG. 3.
Figure 5:
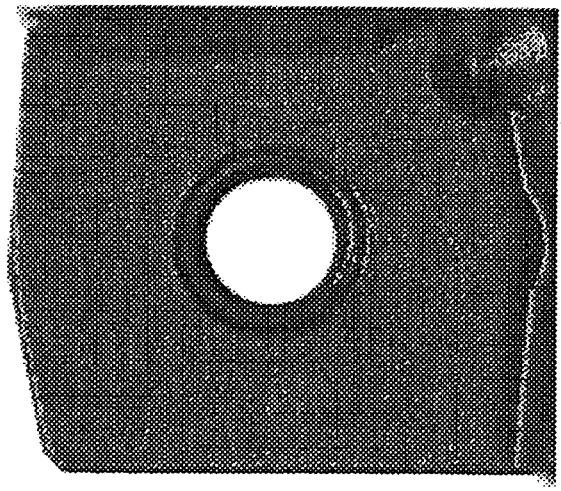
FIG. 5 shows an insert seating in top view, which has been surface hardened and surface treated.

In FIGS. 4 to 5, the difference of a surface of a cutting seat before and after the disclosed exemplary treatment is shown. FIG. 4 shows the surface of a cutting seat before the treatment and FIG. 5 shows the surface of a cutting seat after the treatment. As is seen from this, substantially all scratches and crack initiations are gone in FIG. 5, which of course improves the fatigue strength.

EXAMPLE 1

Figure 6:
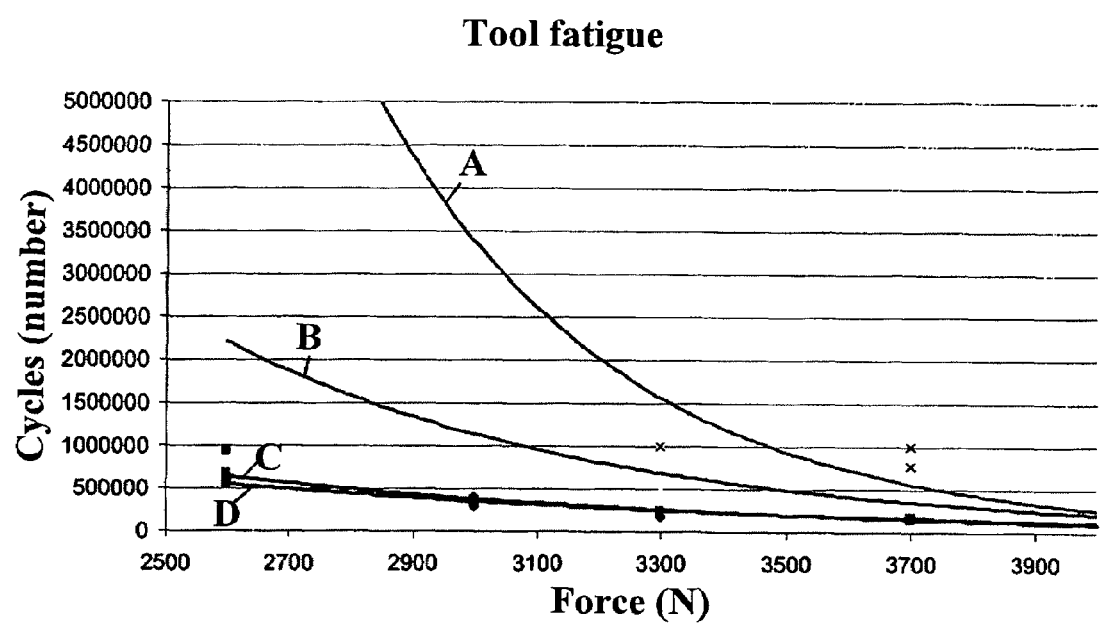
FIG. 6 shows the difference in the number of load cycles to failure of tools manufactured according to prior art and tools manufactured according to the present disclosure, as a function of applied force.

A test bar of a steel material of type SS2242 has been produced and then surface treated according to the embodiments disclosed herein. Subsequently, the test bar has been subjected to a fatigue test. The result of the test is seen in FIG. 6, which shows the number of load cycles as a function of the applied force. In FIG. 6, a test bar that has been treated according to embodiments disclosed herein has been designated A; a test bar that only has been subjected to shot peening is designated B; a test bar that solely has been surface hardened by means of nitrocarburizing to a depth of 0.14 mm is designated C; and D is an entirely untreated test bar, i.e., a commonly hardened tool material.

As is clearly seen from this, an improved strength has been obtained by a treatment first comprising nitrocarburizing followed by micro blasting/shot peening, which confirms that in this way a surprisingly synergistic improvement is achieved beyond what has been found reason to expect in the form of the sum of each one of the same treatments.

After a surface hardening, for relevant tool cutting data, which is approximately 2700 N in FIG. 6, an increase of the fatigue service life is normally obtained by approximately 20% by virtue of provided compressive stresses. After shot peening alone, the fatigue service life increases by approximately 100%, by virtue of provided compressive stresses as well as a surface showing fewer crack initiations. If the material first is submitted to a surface hardening according to the above followed by a surface treatment by, e.g., shot peening, an increase of the fatigue service life by approximately 500% is, however, surprisingly obtained by virtue of major provision of compressive stresses and by parts of or the entire phase-transition layer having been modified/worked so that microcracks and pores in the layer have been removed. Thus, the surface receives a more even geometry without cracks and scratches. The difference between a surface-treated and a not surface-treated tool is seen in FIGS. 4 and 5. The surface treatment, preferably micro blasting/shot peening, gives a contribution of the surface tensions to a level being higher than after the surface hardening alone.

By the surface hardening, followed by a separate surface treatment, the possibility is given to manufacture the product in a softer state, which no longer needs to be particularly good from a wear point of view, since the only purpose thereof is to hold the nitrocarburizing layer. This results in the fact that the same desired high level of precision can now be obtained that previously only could be attained by machining in a hardened state, in machining in this softer material. No subsequent hardening giving great deformations is needed. Now, it is enough with the basic material having sufficient bearing strength. This means, in turn, that mill cutting a finished product in, e.g., 33 HRc instead of 45 HRc is possible, which makes a great difference from a workability point of view. Nitrocarburizing and shot peening give a very small deformation to the product.

Another risk of tool breakdown, usually is that the material in a tool handle, at the portions that are located a distance axially behind the insert seatings, may be subjected to too unfavorable bending and torsion stresses, which may lead to breakage.

It has turned out that also against this type of crack initiations and risk of breakage, a clearly improved material strength has been attained by the disclosed surface treatment.

The described embodiments of the present invention are intended to be illustrative rather than restrictive, and are not intended to represent every possible embodiment of the present invention. Various modifications can be made to the disclosed embodiments without departing from the spirit or scope of the invention as set forth in the following claims, both literally and in equivalents recognized in law.

What is claimed is:

1. A method of production of cutting tools for metalworking, the cutting tool including a holder body manufactured from hardened steel having one or more cutting seats to receive a cutting plate of a hard material, the method comprising:
    surface hardening at least a portion of the holder body to produce a phase-transition layer and a diffusion zone, the diffusion zone under the phase-transition layer and imparting a compressive stress to a surface of the holder body; and
    surface treating the portion of the holder body to impart an additional compressive stress to the surface of the holder body and to modify or remove at least a portion of the phase-transition layer.

2. The method of claim 1, wherein the surface hardening is nitrocarburizing.

3. The method of claim 2, wherein surface treating includes shot peening.

4. The method of claim 2, wherein surface treating includes microblasting.

5. The method of claim 4, wherein microblasting uses small steel balls of a suitable steel material.

6. The method of claim 2, wherein the phase-transition layer extends about 3 to 10 microns from the surface of the holder body and the diffusion zone extends about 100 to 200 microns from the surface of the holder body, and wherein the diffusion zone includes precipitates, a quantity of precipitates decreasing as a depth of the diffusion zone increases from the surface of the holder body.

7. The method of claim 6, wherein surface treating includes shot peening.

8. The method of claim 6, wherein surface treating includes microblasting.

9. The method of claim 8, wherein microblasting uses small steel balls of a suitable steel material.

10. The method of claim 1, wherein surface treating includes shot peening.

11. The method of claim 10, wherein surface treating further includes microblasting.

12. The method of claim 1, wherein surface treating includes microblasting.

13. The method of claim 12, wherein microblasting uses small steel balls of a suitable steel material.

14. The method of claim 1, wherein surface treating removes the entire phase-transition layer.

15. The method of claim 1, wherein surface treating removes microcracks and pores in the phase-transition layer.

16. The method of claim 1, wherein the additional compressive stresses from surface treating are greater than the compressive stresses from surface hardening.

17. The method of claim 1, wherein the hard material is selected from the group consisting of cemented carbide, cermets and ceramics.

18. A cutting tool for chip removing machining of metallic materials formed by the method of claim 1.

19. A cutting tool for chip removing machining of metallic materials, comprising:
    a holder body, the holder body made from hardened steel; and
    one or more cutting seats on the holder body, the cutting seats to receive a cutting plate of a hard material,
    wherein the holder body has a surface-hardened layer comprising an outer phase-transition layer and a diffusion zone, the diffusion zone under the outer phase-transition layer,
    wherein the surface hardened layer has compressive stresses from surface hardening at least a portion of the holder body and from surface treating the portion of the holder body.

20. The cutting tool of claim 19, wherein surface hardening includes nitriding, ion nitriding or nitrocarburizing and wherein surface treating includes shot peening or microblasting the portion of the holder body to impart an additional compressive stress to the surface of the holder body and to modify or remove at least a portion of the phase-transition layer.

21. The cutting tool of claim 19, wherein the cutting tool is a drilling tool having cutting seats on both sides of a centerline of the cutting tool.

22. The cutting tool of claim 21, wherein the surface-hardened layer has a depth of approximately 0.14 mm.

23. The cutting tool of claim 21, wherein compressive stresses from surface treating are greater than compressive stresses from surface hardening.

24. The cutting tool of claim 19, wherein the surface-hardened layer has a depth of approximately 0.14 mm.

25. The cutting tool of claim 19, wherein the hard material is selected from the group consisting of cemented carbide, cermets and ceramics.

* * * * *